T. P. RODGERS.
Improvement in Belt-Shifters.

No. 130,870.                                Patented Aug. 27, 1872.

Witnesses:                                  Inventor:
A Bennensendorf.                            T. P. Rodgers
C. Sedgwick                                 per
                                            Attorneys.

UNITED STATES PATENT OFFICE.

TOPPAN P. RODGERS, OF TAUNTON, MASSACHUSETTS.

IMPROVEMENT IN BELT-SHIFTERS.

Specification forming part of Letters Patent No. 130,870, dated August 27, 1872.

Specification describing a new and Improved Self-Adjusting Belt-Hole Cover, invented by TOPPAN P. RODGERS, of Taunton, in the county of Bristol and State of Massachusetts.

My invention relates to the sliding belt-hole covers used around belts running through floors to shift from side to side as the belts shift and keep the holes covered; and it consists of raised ribs or ways on the plate which is attached to the floor for the shifting cover to rest and move on, with guide-pins in the said plate projecting upward through slots in the cover to guide the latter, whereby the said cover is not liable to be clogged so as to obstruct its working freely, as when arranged in dovetail guides, as heretofore, and is rendered practically successful; whereas all these covers, as before constructed, were considered of doubtful utility on account of so clogging and interfering with the shifting of the belt. My invention also comprises a connection of these raised ribs or ways at each end of the belt-hole by other ribs of the same height, both for supporting the ends of the sliding cover and for preventing the escape of the water, used in washing the floors, down through the belt-hole.

Figure 1:
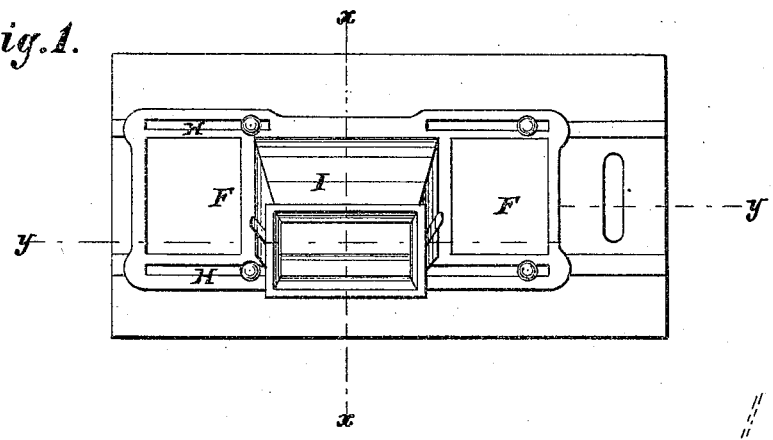
Figure 2:
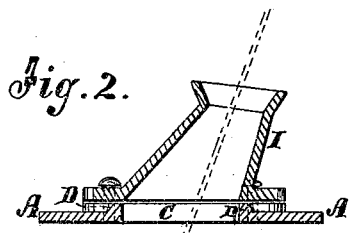
Figure 3:
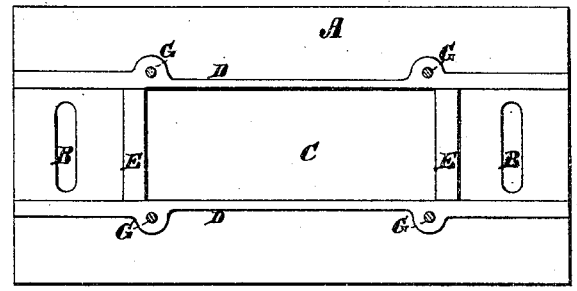
Figure 4:
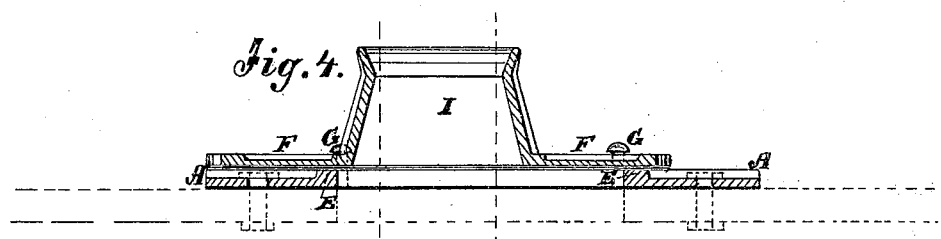

Figure 1 is a plan view of my improved shifting belt-hole cover. Fig. 2 is a transverse section taken on the line $x\ x$. Fig. 3 is a plan of the base plate on which the cover rests and works; and Fig. 4 is a longitudinal sectional elevation of Fig. 1 taken on the line $y\ y$.

Similar letters of reference indicate corresponding parts.

A is the base plate, which is to be attached to the floor over the hole for the belt by screws passing through the slots B, which allow of its adjustment to avoid wearing the belt after being fitted to its place. C is a long wide hole through said plate for the belt, being twice as long as the width of the belt, or more, to allow it to move forth and back in shifting from the loose to the fast pulley, and vice versa. D represents long raised ribs or ways on the upper side of this plate, one on each side of the hole C and parallel with each other; and E represents similar transverse ribs connecting the ways D at each end of the hole C, on which ways the cover F rests and moves in shifting back and forth with the belt, as above described. Said cover is confined on said ways by the stud-pins G, which pass through slots and screw into the plate A below. This cover, like the others heretofore used, has a hole through it as long or a trifle longer than the width of the belt, which is surrounded by a hollow extension, I, upward along the belt, which said extension is contracted, near the top, to the size of the belt or a trifle larger, and flares outward a little thereat, and is used to prevent waste matters on the floor and about from being carried down with the belt. These extensions are, in the case of crossed belts, made in different forms in respect of the shape of the openings, to correspond with the belts so arranged and passing through one hole.

Having thus described my invention, I claim as new and desire to secure by Letters Patent—

A bed-plate for belt-shifters, having the longitudinal parallel ribs D D and the transverse parallel ribs E E arranged on the sides of a hole, C, as and for the purpose described.

TOPPAN P. RODGERS.

Witnesses:
A. A. AUSTIN,
SAML. H. WALKER.